(12) United States Patent
Yellai et al.

(10) Patent No.: US 8,578,007 B1
(45) Date of Patent: *Nov. 5, 2013

(54) PERFORMING AN IN-SERVICE SOFTWARE RELOAD ON A NETWORK DEVICE

(75) Inventors: Prabhakara R. Yellai, San Jose, CA (US); Rengabashyam Srinivas, Fremont, CA (US); Jan Medved, Pleasanton, CA (US); Jian Jin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/433,723

(22) Filed: Mar. 29, 2012

Related U.S. Application Data

(63) Continuation of application No. 11/446,490, filed on Jun. 1, 2006, now Pat. No. 8,190,720.

(51) Int. Cl.
*G06F 9/00* (2006.01)

(52) U.S. Cl.
USPC ............................ 709/221; 709/228; 709/242

(58) Field of Classification Search
USPC ........................ 709/220–222, 228, 242; 713/2
See application file for complete search history.

(56) References Cited

U.S. PATENT DOCUMENTS

| | | | |
|---|---|---|---|
| 5,263,168 A | 11/1993 | Toms et al. | |
| 6,154,849 A | 11/2000 | Xia | |
| 6,314,532 B1 | 11/2001 | Daudelin et al. | |
| 6,393,582 B1 | 5/2002 | Klecka et al. | |
| 6,397,385 B1 * | 5/2002 | Kravitz | 717/173 |
| 6,535,924 B1 * | 3/2003 | Kwok et al. | 709/242 |
| 6,601,186 B1 | 7/2003 | Fox et al. | |
| 6,639,910 B1 | 10/2003 | Provencher et al. | |
| 6,658,659 B2 | 12/2003 | Hiller et al. | |
| 6,718,461 B1 | 4/2004 | Ewertz | |
| 6,880,086 B2 | 4/2005 | Kidder et al. | |
| 6,983,362 B1 | 1/2006 | Kidder et al. | |
| 7,062,642 B1 | 6/2006 | Langrind et al. | |
| 7,222,147 B1 | 5/2007 | Black et al. | |
| 7,225,244 B2 | 5/2007 | Reynolds et al. | |
| 7,359,377 B1 | 4/2008 | Kompella et al. | |
| 7,525,973 B1 | 4/2009 | McRae | |
| 7,814,481 B1 | 10/2010 | Welder et al. | |
| 8,190,720 B1 | 5/2012 | Yellai et al. | |
| 2003/0084440 A1 | 5/2003 | Lownes | |
| 2003/0157899 A1 | 8/2003 | Trossen et al. | |
| 2006/0233182 A1 | 10/2006 | Appanna et al. | |
| 2006/0242402 A1 * | 10/2006 | Swift et al. | 713/2 |
| 2007/0162565 A1 | 7/2007 | Hanselmann | |

OTHER PUBLICATIONS

Li, V.O.K.; Zaichen Zhang, "Internet multicast routing and transport control protocols," Proceedings of the IEEE, vol. 90, No. 3, pp. 360-391, Mar. 2002, URL: http://ieeexplore.ieee.org/stamp/stamp.jsp?arnumber=993404&isnumber=21426.

(Continued)

*Primary Examiner* — Thai Nguyen
(74) *Attorney, Agent, or Firm* — Merchant & Gould

(57) ABSTRACT

A software reload is executed. The hardware associated with the network device continues to forward network traffic during the software reload. Also, a kernel of the network device operates unaffected in a protected address space throughout the software reload. Further, the kernel preserves local checkpointed and shared memory data. Application processes running on the network node are shut down gracefully. The reloaded software is brought up and the network device is resynchronized.

18 Claims, 5 Drawing Sheets

(56) References Cited

OTHER PUBLICATIONS

Gallo et al., "Networking Explained, Second Edition", Dec. 15, 2001, Digital Press, pp. 42-44.
Baumann, Andrew; "Improving Operating System Availability With Dynamic Update", Sep. 14, 2004, 7 pgs.
Riverstone Networks Whitepapers, "MPLS/VPLS Evolution: A Riverstone Perspective", Nov. 5, 2004, 9 pgs.
Bowen et al., "Availability in parallel systems: Automatic process restart", Feb. 1997, 17 pgs.
Roch, Benjamin; "Monolithic kernel vs. Microkernel", Jul. 7, 2004.
Ask the IT Guys: "How to Set Session Time-outs for Cisco Routers and Switches"; Apr. 10, 2005; 2 pgs. http://www.asktheitguys.com/loader.php?table=articles&articl_num=1019.
Stolowitz Ford Cowger LLP, "Listing of Related Cases", May 31, 2012, 1 page.

\* cited by examiner

PERFORMING AN IN-SERVICE SOFTWARE RELOAD ON A NETWORK DEVICE

CROSS-REFERENCE TO RELATED APPLICATION

This application is a continuation of U.S. patent application Ser. No. 11/446,490, Jun. 1, 2006, now U.S. Pat. No. 8,190,720 which is incorporated herein by reference.

TECHNICAL FIELD

Embodiments relate to the field of network communications. More particularly, embodiments of the present invention relate generally to on-the-fly reloading and in-service upgrading of software in network devices.

BACKGROUND

A network provides an infrastructure that facilitates communication between electronic systems, or computer systems, associated with end users. Internetworking protocols allow for the transfer of communication between two or more individualized networks. As such, smaller, individualized networks, such as, local area networks (LAN), are combined into a larger internetwork capable of providing communication services to an ever increasing number of end users. For example, the Internet is a global interconnection of individual networks.

Network devices are hardware devices that facilitate communication through a network. For example, the heart of a network typically includes hubs, switches, routers, access servers, and firewalls. The hub acts as a central point to host computers associated with end users in a local network. As such, the host computers and the hub make up a LAN segment. A switch connects the host computers of a particular LAN to an internetwork of a collection of LANs. The switch provides for a single switched virtual circuit to facilitate communication between two host devices through a larger internetwork across two or more LANs. Access servers connect remote users that are not part of any network to one or more networks. Firewalls act as checkpoints that check message traffic for harmful and unwanted data before routing the traffic through. Routers are intelligent devices that forward message traffic based on the Internet protocol (IP) addresses provided.

Upgrades to software that are used for implementing specific features or services as provided by a network device are necessary to capture new features, enhancements, and fixes to programming errors. For example, software upgrades are implemented when customers want or need new and additional features added to their existing software applications. Also, solutions to specific programming errors require an upgrade to their existing software applications.

However, under traditional approaches, a significant impact on the availability of a network device occurs when upgrading associated software. In general, hardware associated with the network device needs resetting and the network device requires rebooting to initialize upgrades to software associated with a network device. This network device downtime problem occurs also when resetting the network device after a general failure that does not require any software upgrades. As a result, downtime of a particular network device impacts the capability of an associated network to pass communication (e.g., network traffic).

In particular, delays occurring during the installation of upgrades, or during a reset of software, in one example, can be attributed to the loading of the software image code and the resetting of hardware components associated with the network device. Because of these issues, the network device with software to be upgraded may be cutoff from an associated network. This leads to termination of current network traffic held between the network device that is being upgraded and other network devices.

Specifically, prior art methods brought the network device down from the network when installing the software image. The software image comprises the programming code for the upgrade or reset of software that runs a network device. In some cases, the software image is transferred from a secondary device, such as, a hard disk, floppy disk, CDROM, etc. In other cases, the software image is downloaded from a server through the network. For example, the software images can be loaded from flash cards, disks, or from a trivial file transfer protocol (TFTP) server via a network.

Also, prior art methods required at least a minimum reset of many hardware components associated with the network device. As such, hardware components are reset during an upgrade to the software, and the network device is rebooted from scratch in order to initialize the upgraded software images. As a consequence, delivery of network traffic may be interrupted during the hardware reset.

In both cases, these may lead to the physical layer of a network going down. Consequently, a disruption would impact the proper forwarding of network traffic during the software upgrade procedure. This effect may, in one example, spread to upper layers in a network or communication session, resulting in route flaps, traffic loss, etc. These other network devices may undergo disruptions as a result of the termination of the communication session, thereby proliferating further delays throughout a network due to network device downtimes. Since the availability of a network device is critical and software upgrades are necessary, it is important to reduce the downtime of a network device during a software upgrade.

To address these concerns, in one prior art approach, a software upgrade is performed on a monolithic address space system by first loading the upgrade software into a temporary location before initiating the actual upgrade process. Secondly, a minimal reset of hardware components may be performed. This is because, many components will generate interrupts which will make certain portion(s) of the operating code to be accessed. During the upgrade process, the operating code will not be available, resulting in unexpected behavior. Boot strap code is utilized to overwrite the old software image with the new software image. Then new image is then "jumped into" and starts executing. Next, the operations of the hardware components are resumed.

However, this approach is unable to perform an in-service software upgrade. Moreover, this approach is not suitable to be applied to microkernal environments. Specifically, this approach still requires a minimal reset of hardware, a termination of all application processes running on the network device, and a restart of the kernel of the network device. Consequently, this prior art approach still causes forwarding outages and interruptions in network traffic communication.

DETAILED DESCRIPTION OF THE DRAWINGS

Figure 1:
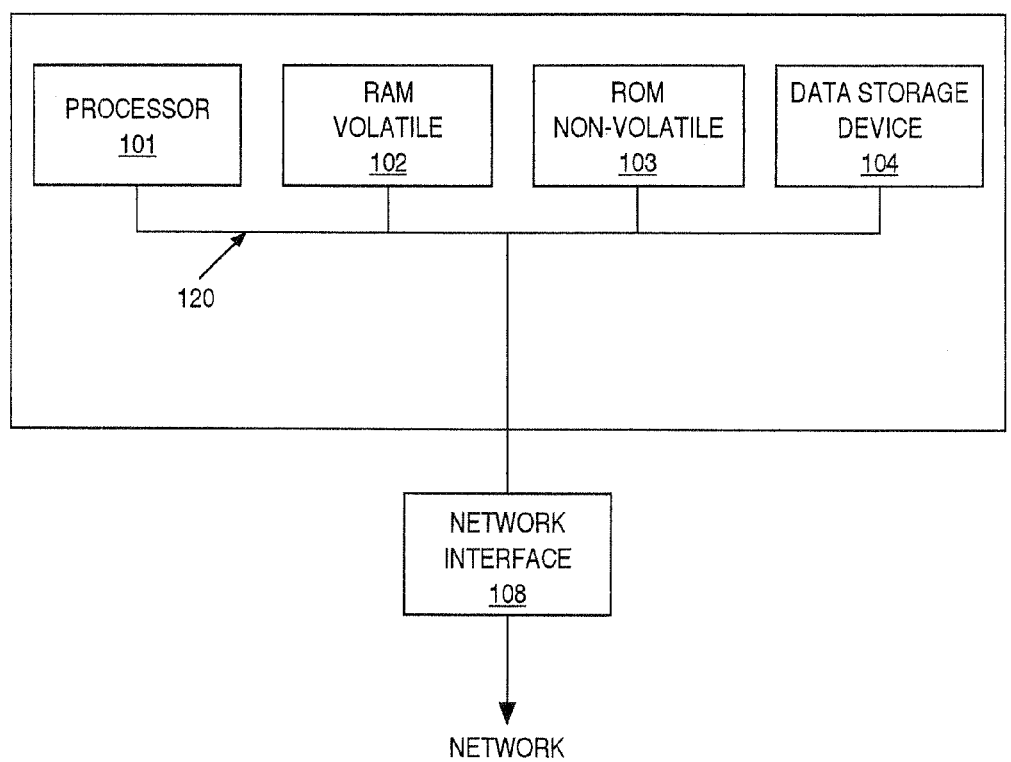
FIG. 1 is a block diagram of interior components of an exemplary electronic system, upon which embodiments may be implemented.

Reference will now be made in detail to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which can be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter can be practiced without these specific details. In other instances, well known methods, procedures, components, and circuits have not been described in detail as not to unnecessarily obscure aspects of the claimed subject matter.

In overview, embodiments generally relate to upgrading and reloading of software (e.g., application process) in network devices. In one example, embodiments relate to methods and systems for performing an on-the-fly non-disruptive software upgrade and system restarts in microkernel based systems. Embodiments set forth methods and systems that are able to achieve in-service software upgrading of a network device without having to reboot the network device's associated hardware. Further, a kernel, such as a microkernel, executes unaffected in a separate, protected address space.

Embodiments may be directed towards microkernel based systems. A microkernel based system includes a microkernel and a set of user-level processes in different address spaces. Thus, the microkernel may be executing in a protected address space that is separate from the user-level processes. Consequently, different from traditional approaches, user-level processes can be shut down without affecting the microkernel. In order for a microkernel based system to achieve high availability, an application process can be made restartable in such a way that it does not impact hardware upon restart. It should be noted that the drivers are user-level processes which can be restartable without impacting associated hardware by storing critical process data in local memory (e.g., local checkpoint data storage, and/or local shared memory). Upon restart, an application process can utilize checkpointed data and/or locally stored data and does not have access or reprogram any hardware associated with the network device. Also, embodiments allow the restart to be performed while the associated hardware is able to continue to forward network traffic while the software restart is performed. Moreover, in one embodiment, the microkernel of the microkernel based system is able to operate unaffected in a protected address space while the software (e.g., application process) restart is performed.

In one embodiment, an in-service software reload is performed on a network node (e.g., an instance of a network card). A software reload is executed. The hardware associated with the network node continues to forward network traffic during the software reload. Also, a kernel (e.g., a microkernel) of the network node operates unaffected in a protected address space throughout the software reload. Further, the kernel preserves local checkpointed and shared memory data. Application processes running on the network node are shut down gracefully. The reloaded software is initiated and the network node is resynchronized. Accordingly, in one example, upon restart, application processes can utilize the checkpointed data and do not have to access or reprogram any hardware associated with the network node.

Also, in one example, if the software reload is in response to a software upgrade that includes installation of a new software and the network node has insufficient memory for installing the new software, then shutting down includes terminating all application processes running on the network node except application processes needed for installation of the new software and server processes. Also, shutting down includes loading the new software into memory of the network node. Moreover, shutting down includes terminating the application processes needed for loading the new software. If the software reload is in response to a failure recovery, then shutting down includes terminating all application processes.

Advantageously, embodiments, in one example, are able to utilize the same processes infrastructure for individual process restarts and for in-service software reload. Another advantage is that drivers can be upgraded without having to restart the card. Also, embodiments, in one example, is able to deal with in-service software reload(s) on a per-process basis. Further, in contrast to conventional approaches, embodiments do not have to perform minimal hardware reset and can continue to forward network traffic as a software reload is executed. Moreover, embodiments, in one example, does not need to overwrite existing code and the kernel (e.g., microkernel) operates unaffected in its own protected address space. In addition, embodiments allow network device hosted protocol sessions to stay up during restart. A network device includes, but is not limited to, line cards, fabric cards, nodes, etc. Also, embodiments, in one example, offers shorter system boot times. Additionally, embodiments are scalable for a system with large number of processes and libraries. Further, embodiments enable "fast boot" of a network device (e.g., a router) where a card in the system is restarted through an in-service software reload.

Referring now to FIG. 1, portions of the present invention are comprised of computer-readable and computer-executable instructions which reside, for example, in computer-readable media of an electronic system that are networked devices, such as, a server computer, mainframe, networked computer, workstation, hub, router, switch, firewall, access server, and the like. FIG. 1 is a block diagram of interior components of an exemplary electronic system 100, upon which embodiments may be implemented.

While embodiments of the present invention are described within the context of networked devices, other embodiments of the present invention are well suited to implementations within any electronic device. More specifically, other embodiments of the present invention are well suited for methods and systems of upgrading and/or reloading system software on any electronic device.

Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes an optional data storage device 104 (e.g., memory card, hard drive, etc.) coupled with the bus 120 for storing information and instructions. Data storage device 104 can be removable. With reference still to FIG. 1, a network interface 108 (e.g., signal input/output device) is provided which is coupled to bus 120 for providing a communication link between electronic system 100 and a network environment. As such network interface 108 enables the central processor unit 101 to communicate with or monitor other electronic systems or coupled to a communication network.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "performing," "separating," "resetting," "maintaining," "recovering," and "loading," and "executing," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Figure 2:
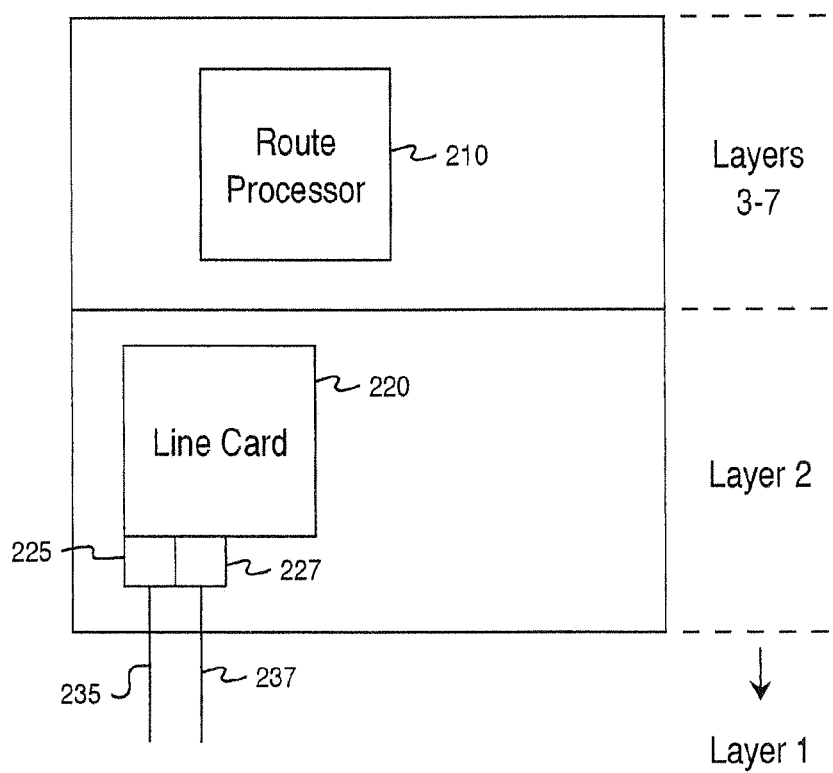
FIG. 2 illustrates block diagrams of a network device that is capable of upgrading and/or reloading hardware with minimal disruption to network traffic is disclosed, upon which embodiments may be implemented.

Referring now to FIG. 2, a block diagram of a network device 200 that is capable of upgrading and/or reloading hardware with minimal disruption to network traffic is disclosed, upon which embodiments may be implemented. FIG. 2 is an exemplary diagram of the implementation of the International Organization for Standardization Open Systems Interconnection (ISO/OSI) reference model within the network device 200. The ISO/OSI reference model provides for a seven-layered architecture within network devices that standardizes interconnections between communicating network devices through a network.

As described previously, the network device 200 is any electronic system that facilitates communication between end users in a network. For example, in embodiments of the present invention, the network device 200 is a hub, or a switch, or a router, or a server, or an access server, or a firewall, etc.

For purposes of illustrating the methods and systems of the present Application, the network device 200 is divided into three parts. Each of the parts of the network device 200 is associated with one or more layers in the ISO/OSI reference model.

In the network device 200, the route processor 210 provides control plane functionality during communication sessions involving the network device 200. In relation to the ISO/OSI reference model, the route processor 210 provides functionality for layers three, four, five, six, and seven of the ISO/OSI reference model, or the network, transport, session, presentation, and application layers, respectively in the network device 200.

More specifically, the control plane of the network device 200 provides for keeping the network device 200 in the network. For example, in a network device 200 that is a router, the control plane provides the routing protocol layer to facilitate the routing of message traffic through the router. In addition, the control plane establishes and terminates connections for communication sessions between computers associated with end users. For example, the control plane will terminate a communication session after a predetermined time-out period. In one embodiment, a time-out period can be extended by sending message to peer network devices.

Returning back to FIG. 2, the network device 200 also comprises a plurality of layer two and/or layer three devices. In the configuration of FIG. 2, the plurality of layer two/three devices comprises a plurality of add-on modules that are plugged into the network device 200. These add-on modules facilitate networking within a particular networking environment, and as such, are defined as network interface modules, or line cards. For example, in network device 200, the line card 220 is a layer two/three device. Line card 220, for instance, is an Ethernet card for facilitating the Ethernet networking protocol. In addition, the network device 200 comprises one or more layer two/three devices in various embodiments.

Communicatively coupled to the line card 220 is a plurality of port adapters. For example, line card 200 comprises port adapter 225 and port adapter 227. Each of the port adapters 225 and 227 provide an interface through which message traffic is transferred between the network device 200 and other devices on the network in a communication session. That is, the port adapters 225 and 227 provide an interface for connection to external network devices. While FIG. 2 discloses two port adapters associated with line card 220, other embodiments of the present invention are well suited to line cards comprising one or more port adapters.

The network device 200 is capable of upgrading and/or reloading software operations associated with the layer two/three devices while, in one example, not disrupting the communication occurring at layers other than layer two/three in the ISO/OSI reference model. That is, the software operations at layer two/three of the network device is upgraded and/or reloaded without terminating the communication session at layers other than layer two/three of the ISO/OSI reference model. Specifically, in one embodiment, the software of a micro-kernel based system may be upgraded while its associated hardware continues to forward network traffic. Also, the microkernel is able to operate unaffected in a protected address space while the in-service software reload is in progress.

Lines 235 and 237 comprise the physical layer, or layer one, of the ISO/OSI reference model for the network device

200. The physical layer, layer one, defines the communication medium by which message traffic is transferred through the port adapters of the network device 200. For example, the communication medium may be defined by electrical, mechanical, or optical characteristics. As such, the communication medium is comprised of, for example, twisted-pair cabling, fiber-optic cabling, coaxial cabling, etc.

Figure 3:
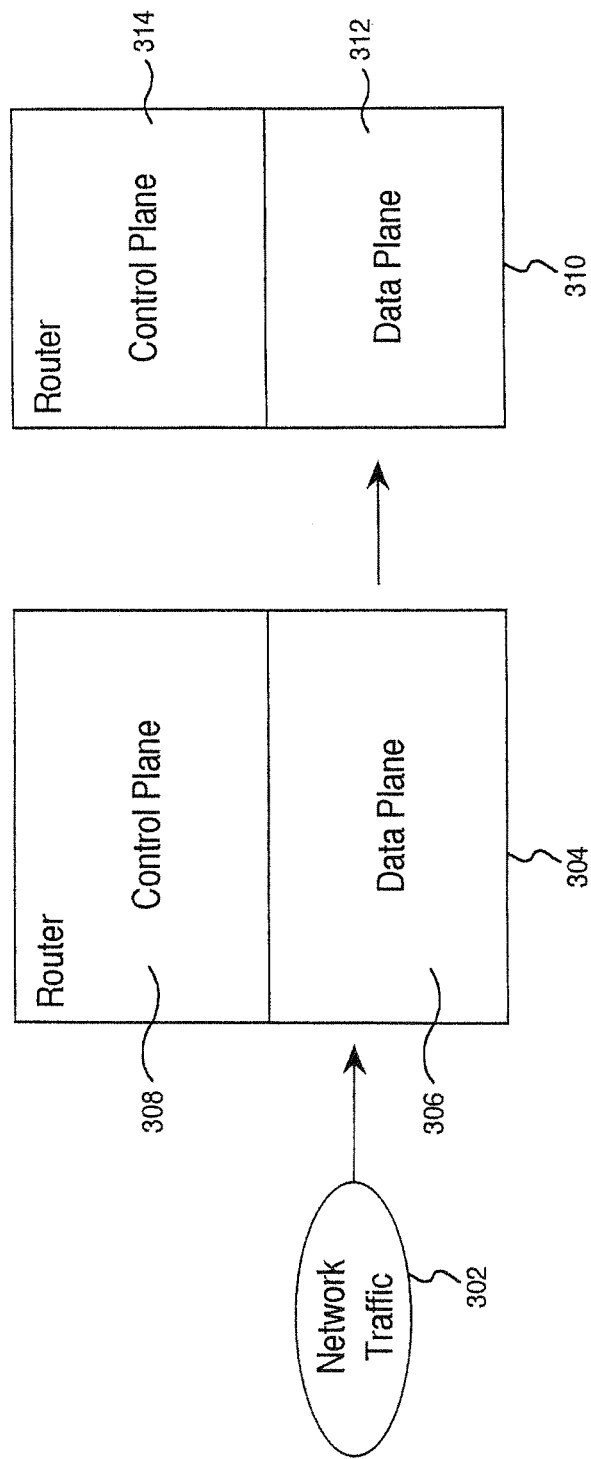
FIG. 3 illustrates block diagrams of network traffic passing through a router that is executing a on-the-fly software reload, upon which embodiments may be implemented.

FIG. 3 illustrates block diagrams of network traffic passing through a router that is executing an on-the-fly software reload, upon which embodiments may be implemented. FIG. 3 includes network traffic 302, router 304, router 310, control plane 308, data plane 306, control plane 314, and data plane 312. Although FIG. 3 is shown and described as having certain numbers and types of elements, the present claimed subject matter is not so limited; that is, FIG. 3 can include elements other than those shown, and can include more than one of the elements that are shown. For example, FIG. 3 can include a greater or fewer number of routers than the two routers (routers 304 and 310) shown.

Network traffic in general can be classified as either control plane traffic or data plane traffic. In general, the vast majority of network traffic is data plane traffic and often can be independently forwarded by the hardware portion of a network device (e.g., a router) alone. Control plane traffic makes up the remaining small portion of network traffic and refers to routing updates, keepalives, and network management that, in one example, are processed by a route processor or a line card.

Because embodiments are able to perform an in-service software reload on a network device (e.g., a router) without restarting its associated hardware, in one example, the majority of network traffic can be forwarded without disruption. In one embodiment, a hot restart is performed on router 304 and the hardware associated with router 304 continues to process network traffic during the hot restart and forwards network traffic from 302 to router 310.

Figure 4:
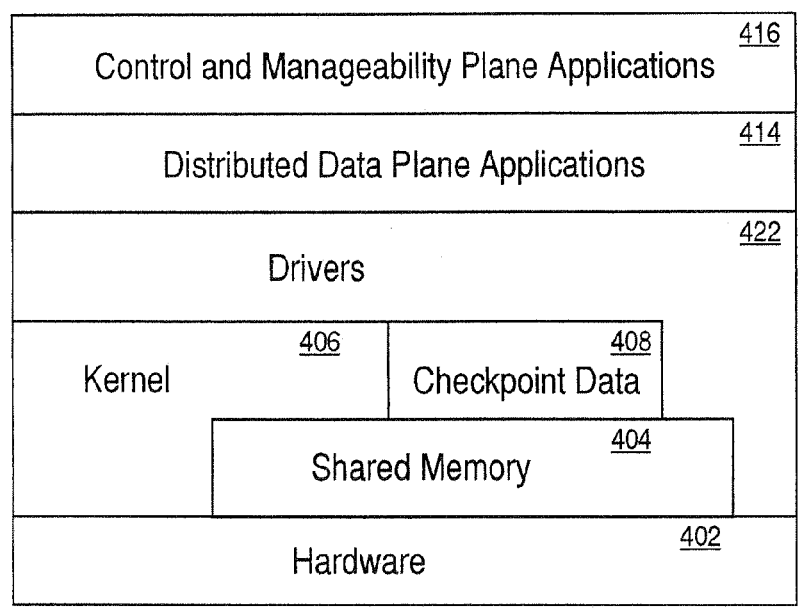
FIG. 4 illustrates a network device, upon which embodiments may be implemented.

FIG. 4 illustrates hardware 402 of a network device, shared memory 404, checkpoint data 408, kernel 406 (e.g., a microkernel), drivers 422, distributed data plane applications 414, and control plane applications 416. In one embodiment, the upgraded software is first put in place if the network node provides local persistent storage (e.g., flash memory). In one embodiment, the software reload is a in-service software reload. Also, in one embodiment, the network node is running on a line card.

Figure 5:
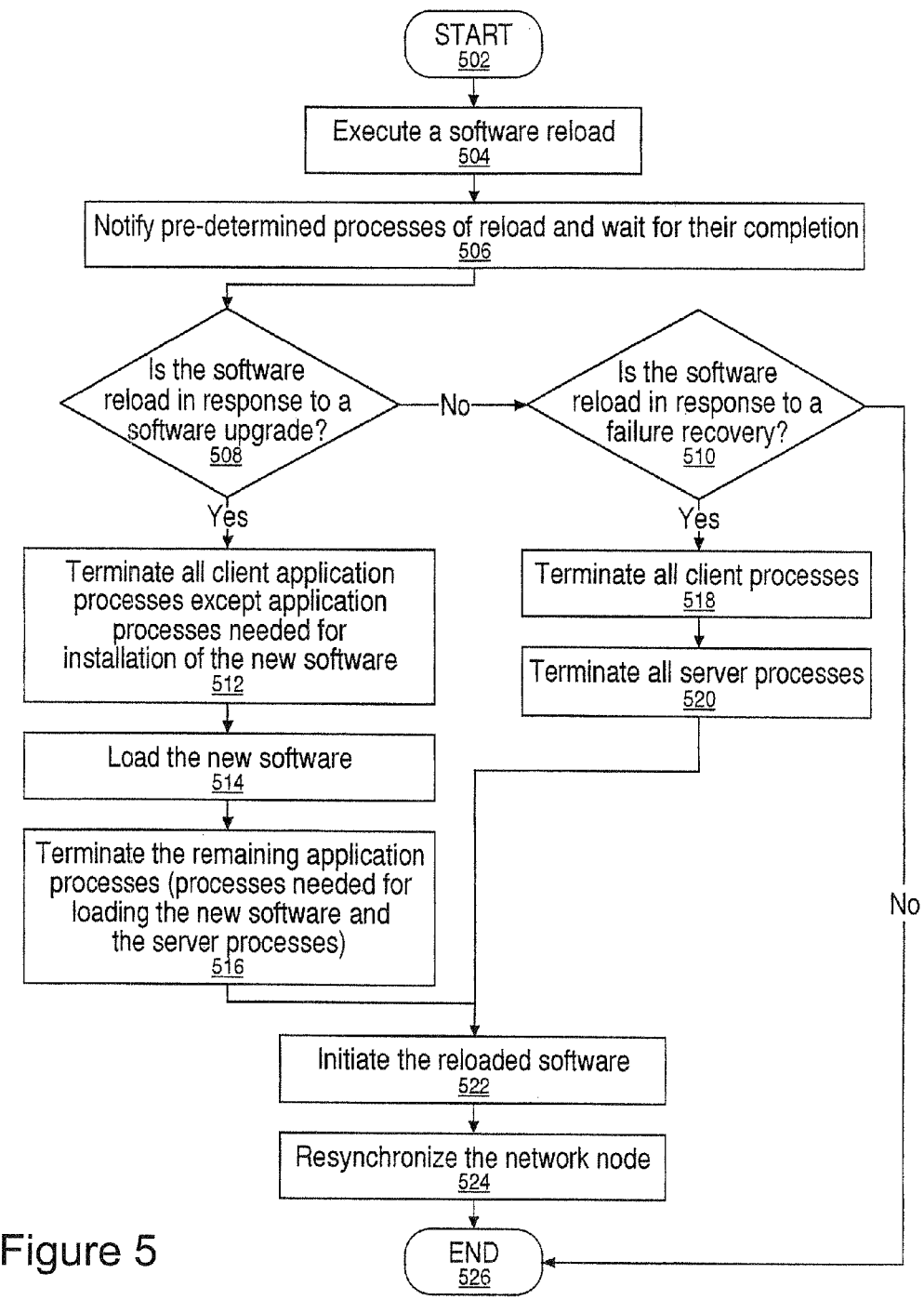
FIG. 5 illustrates a flowchart of a method for performing an in-service software reload on a network node upon which embodiments in accordance with the present claimed subject matter can be implemented.

FIG. 5 illustrates a flowchart 500 of a method for performing an in-service software reload on a network node upon which embodiments in accordance with the present claimed subject matter can be implemented. Although specific steps are disclosed in flowchart 500, such steps are exemplary. That is, embodiments of the present claimed subject matter are well suited to performing various other or additional steps or variations of the steps recited in flowchart 500. It is appreciated that the steps in flowchart 500 can be performed in an order different than presented.

At block 502, the process starts. At block 504, a software reload (e.g., in-service software reload) is executed. The hardware associated with the network node continues to forward network traffic during the software reload and a kernel (e.g., a microkernel) of the network node operates unaffected in a protected address space. The kernel preserves local checkpointed and shared memory data. The software reload can be implemented for a software upgrade/downgrade and/or to recover from a fatal software error.

At block 506, a set of processes will be notified about the in-service software reload that is going to be performed. In one embodiment, these processes are identified through explicit registration and/or through static definition in the code. In one embodiment, these processes send messages to the peer network devices to extend the hello and/or keep-alive timeout values to large enough to cover the software reload duration. Such notification to this set of processes can be sent using any IPC mechanism such as messages, FIFO queues, semaphore based synchronization, signals etc.

At block 508, it is determined whether the software reload is in response to a software upgrade. If it is determined that the software reload is in response to a software upgrade, the process proceeds to block 512. If it is determined that the software reload is not in response to a software upgrade, the process proceeds to block 510.

At block 510, it is determined whether the software reload is in response to a failure recovery. If it is determined that the software reload is in response to a failure recovery, then the process proceeds to block 518. If it is determined that the software reload is not in response to a failure recovery, then the process proceeds back to block 526 to end it.

At block 512, it is determined that the software reload is in response to a software upgrade. All client application processes except the processes that are needed for installation of the new software are terminated gracefully. In one embodiment, the processes are notified using any IPC (Inter-Process Communication) mechanism like messages, FIFO queues, semaphore-based synchronization, signals (SIGTERM), etc. The processes complete the critical operations and are out of critical section before terminating. In one embodiment, the gracefully terminated processes complete writing to shared memory and/or writing to checkpointed data and/or programming of associated hardware and/or writing to files. At block 514, the new software is loaded into the main memory such as Random Access Memory (RAM), Static Random Access Memory (SRAM), etc. on the network device. In one embodiment, the new software is also loaded onto persistent storage locally available on the network device like flash disk, Non-Volatile Random Access Memory (NVRAM) or hard disk. The software can be an upgrade software or a downgrade software. At block 516, application processes left, that is, the server processes and the processes needed for loading the new software, are terminated gracefully.

At block 518, it is determined that the software reload is in response to a failure recovery and all client application processes are terminated. In block 520, all server processes are terminated.

At block 522, the reloaded software is initiated. In one embodiment, initiation of the reloaded software includes using the checkpointed data and the shared memory data to perform an in-service software reload. In one embodiment, the initiated software is given the impression of process restart rather than a line card reload, which allows application processes in rebuilding all the state/critical information from the shared memory, and as such, hardware initialization is skipped.

At block 524, the network node is resynchronized. In one embodiment, resynchronizing further comprises resynchronizing the network node with other associated network nodes. In another embodiment, the resynchronizing further comprises resynchronizing the network node with hardware of the network node. In one embodiment, the drivers will reconcile differences between the software state and the hardware state and reprogram the hardware by way of an in-service software reload. At block 526, the process ends.

Embodiments set forth methods and systems for performing an in-service software reload on a network node. In one embodiment, the kernel (e.g., microkernel) is kept running and is used to preserve the local checkpointed and shared memory data. When the application processes are restarted, they can access and utilize the respective checkpoint data and shared memory data to perform an in-service software reload. In one example, a driver process does not reprogram the hardware but uses the checkpointed data to recover the hardware state information instead. In one example, because each application process is performing an in-service software reload, non-stop forwarding (NSF) is not affected during the software reload. Moreover, in one example, during software upgrades and/or downgrades, all application processes are restarted and start running a new version of the code.

Advantageously, embodiments allow in-service software upgrade with practically no impact on network traffic. Further, because embodiments do not need to overwrite existing code and the kernel operates unaffected in a protected address space, embodiments are more robust than conventional software reload approaches. Moreover, embodiments do not need to perform minimal reset of hardware. Consequently, embodiments help decrease forwarding outages during software reload. Also, embodiments allow all the line cards in a system to be restarted through an in-service software reload, which reduces software upgrade time significantly.

In the foregoing specification, embodiments of the claimed subject matter have been described with reference to numerous specific details that can vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   executing a software reload on a network device, wherein hardware associated with the network device continues to forward network traffic during the software reload, wherein a kernel of the network device operates unaffected in a protected address space, and wherein the kernel preserves local checkpointed and shared memory data;
   shutting down application processes running on the network device gracefully;
   maintaining continuity of network traffic between the network device and another network device coupled to the network device through a network, wherein the hardware of the network device is not reset during the software reload and continues to forward the network traffic; and
   signaling the another network device to extend a keep alive timeout duration for an amount of time that corresponds to an anticipated duration for the software reload; wherein the shutting down further comprising: if the software reload is in response to a software upgrade that includes installation of a new software: notifying pre-determined set of processes of the software reload; terminating all application processes running on the network device except application processes needed for installation of the new software and server processes; loading the new software into memory of the network device; and terminating the application processes needed for loading the new software; if the software reload is in response to a failure recovery: terminating client processes; and terminating server processes.

2. The method of claim 1, wherein the signaling uses a component operated by the another network device.

3. The method of claim 2, wherein the component operated by the another network device comprises an InterProcess Communication (IPC) mechanism.

4. The method of claim 1, further comprises utilizing the checkpointed data and the shared memory data to perform the software reload.

5. The method of claim 1, further comprising synchronizing the network device with the another network device after the software reload.

6. The method of claim 5, wherein the synchronizing further comprises synchronizing the network device with hardware of the another network device.

7. The method of claim 1, further comprising reloading device driver software without requiring a kernel restart.

8. The method of claim 7, wherein the kernel is a microkernel.

9. The method of claim 1, further comprising fast boosting a router.

10. An apparatus, comprising:
    a processing device; and
    a memory including instructions executable by the processing device, the processing device when executing the instructions operable to:
    execute a software reload on a network device, wherein hardware associated with the network device continues to forward network traffic during the software reload, wherein a kernel of the network device operates unaffected in a protected address space, and wherein the kernel preserves local checkpointed and shared memory data;
    shut down application processes running on the network device gracefully;
    maintain continuity of network traffic between the network device and another network device coupled to the network device through a network, wherein the hardware of the network device is not reset during the software reload and continues to forward the network traffic;
    signal the another network device to extend a keep alive timeout duration for an amount of time that corresponds to an anticipated duration for the software reload; and
    resynchronize the network device; wherein shutting down application processes running on the network node gracefully further comprises: if the software reload is in response to a software upgrade that includes installation of a new software: notify pre-determined set of processes of the software reload; terminate all application processes running on the network device except application processes needed for installation of the new software and server processes; load the new software into memory of the network device; and terminate the application processes needed for loading the new software; if the software reload is in response to a failure recovery: terminate client processes; and terminate server processes.

11. The apparatus of claim 10, wherein the signaling uses a component operated by the another network device.

12. The apparatus of claim 11, wherein the component operated by the another network device comprises an Inter-Process Communication (IPC) mechanism.

13. The apparatus of claim 10, wherein the operations further comprise utilizing the checkpointed data and the shared memory data to perform the software reload.

14. The apparatus of claim 10, wherein the operations further comprise synchronizing the network device with the another network device after the software reload.

15. The apparatus of claim 14, wherein the synchronizing further comprises synchronizing the network device with hardware of the another network device.

16. The apparatus of claim 9, wherein the operations further comprise:
   terminating application processes running on the network device gracefully;
   loading the new software corresponding to the software upgrade; and
   starting the new software on the network device.

17. The apparatus of claim 10 wherein the operations further comprise aborting the software reload if an application process fails to terminate properly.

18. The apparatus of claim 10, wherein the operations further comprise causing the kernel to purge all application process information exception for shared memory and memory reserved for a minimum boot image file system.

\* \* \* \* \*